Patented Oct. 18, 1938

2,133,672

UNITED STATES PATENT OFFICE 2,133,672

REFRACTORY

Joseph T. Singewald, Jr., Baltimore, Md., assignor to The Standard Lime and Stone Company, Baltimore, Md., a corporation of Maryland No Drawing. Application April 1, 1936,
Serial No. 72,175

4 Claims. (Cl. 106—9)

The present invention relates to the production of a refractory material, especially adapted for use as a lining in open hearth furnaces, and particularly steel furnaces.

Magnesite, typified by Austrian magnesite, dead burned dolomite, and dolomite stabilized with certain fluxes, have all been used extensively as open hearth refractories. Dead burned dolomite is an unstable product. Stabilized dolomite refractory gives fairly satisfactory results, but in common with all dolomite refractories, has a higher calcium oxide content than magnesium oxide content, resulting in considerable reaction between the refractory when used as an open hearth lining, and the open hearth slag, whereby the strength and durability of the furnace lining, particularly that of the banks, is greatly impaired. The magnesite refractories are deficient in bonding constituents, and, consequently, absorb such constituents or elements thereof from the slag.

The following are typical analyses of Austrian magnesite and a dolomite refractory:

|  | Austrian magnesite | Dolomite refractory |
|---|---|---|
| MgO | 89.45 | 30.20 |
| CaO | 2.21 | 54.62 |
| Fe₂O₃ | 6.12 | 10.11 |
| Al₂O₃ | 0.98 | 1.63 |
| SiO₂ | 1.00 | 3.12 |
| Ignition loss | 0.24 | |

The following is a typical analysis of an open hearth steel slag:

| MgO | 6.80 |
|---|---|
| CaO | 37.65 |
| Fe₂O₃ | 25.81 |
| Al₂O₃ | 3.86 |
| SiO₂ | 13.28 |
| MnO | 8.19 |
| P₂O₅, Cr₂O₃, S | 1.85 |

In accordance with the present invention, there is provided a refractory having a composition which inhibits for a substantial period during "the heat" any appreciable reaction and/or chemical interchange with the slag in an open hearth furnace. Stated differently, the object of the present invention is the provision of a refractory which is in equilibrium with the slag for a substantial period during "the heat". It is desired to point out that the refractory is not in equilibrium with the slag during the entire heat. What occurs is that an equilibrium is reached during the heat and maintained during an appreciable time interval. Later in the heat this equilibrium condition becomes unstable and the refractory lining is subjected to attack by the slag. The refractory of the present invention saves the earlier attack that all other refractories are subjected to.

However, the composition of the refractory lining through reactions with the slag does change during the latter part of the heat, and these reactions, during the latter part of "the heat", are substantially the same, irrespective of what the original composition of the refractory may have been.

Broadly, it has been discovered that a refractory containing less magnesia than magnesite refractories, and more magnesia than dolomite refractories, and more calcium expressed as lime than magnesite refractories, and less lime than dolomite refractories, and no free lime, is subject to less corrosion and erosion in use than either the magnesite refractory or dolomite refractory.

The mineralogical compositions of typical linings made of magnesite and dolomite refractory are:

|  | Magnesite | Dolomite refractory |
|---|---|---|
|  | Percent | Percent |
| Periclase | 87.66 | 30.20 |
| Magnesioferrite | 8.40 | 0.00 |
| Dicalcium silicate | 2.87 | 8.94 |
| Dicalcium ferrite | 0.83 | 20.61 |
| Excess lime | 0.00 | 39.93 |

It is to be noted that these refractories contain what may be termed "refractory oxides", such as periclase (MgO), magnesioferrite (MgO.Fe₂O₃), and magnetite (FeO.Fe₂O₃); and bonding constituents typified by compounds such as dicalcium silicate (2CaO.SiO₂) and dicalcium ferrite (2CaO.Fe₂O₃).

Expressed in terms of refractory oxides and bonding constituents the composition of the magnesite lining and the dolomite refractory lining are:

|  | Magnesite | Dolomite refractory |
|---|---|---|
|  | Percent | Percent |
| Refractory oxides | 96.06 | 30.20 |
| Bonding constituents | 3.70 | 29.55 |
| Excess lime | 0.00 | 39.93 |

It is preferred when the refractory is used as an open hearth furnace lining, that it have a magnesia or MgO content which inhibits for a substantial period during "the heat" any appreciable reaction and/or chemical interchanges with an open hearth steel slag. This magnesia content will be in the neighborhood of forty-five per cent (45%) MgO. With a forty-five per cent (45%) magnesia content, the other constituents of the refractory may vary over a rather wide range, provided the relative relation between the basic oxides and the acid oxides is such that the refractory consists of seventy per cent (70%) of refractory oxides.

It is not desired, even in the more limited aspect of the invention, to be limited closely to a refractory having a magnesia content of about forty-five per cent (45%). In accordance with the present invention, a refractory with forty per cent (40%) magnesia will function better than one with thirty-five per cent (35%) magnesia content, and a refractory with fifty per cent (50%) magnesia content will function better than one with fifty-five per cent (55%) magnesia content. The present invention is based upon the discovery that a refractory nearer forty-five per cent (45%) magnesia will function better than one departing more widely from forty-five per cent (45%) magnesia. In other words, the present discovery and invention resides not so much in a refractory of a definite composition, but in a refractory which has a magnesia content between that of magnesite and dolomite, and is substantially devoid of free lime.

An illustrative example of a refractory containing forty-five per cent (45%) MgO is:

| | Per cent by weight (about) |
|---|---|
| MgO | 45 |
| CaO | 20 |
| Iron oxides | 20 |
| $SiO_2$ | 8 |
| Manganese oxides | 8 |

Expressed in terms of refractory oxides and bonding materials, the composition is:

| | Per cent by weight (about) |
|---|---|
| Refractory oxides | 70 |
| Bonding material | 30 |

The refractory oxides have a very high melting point and by themselves would not form a coherent strong body. The bonding constituents have a melting point low enough that they melt or at least become soft and sticky, and serve to form with the refractory oxides a coherent, strong body.

It is to be noted that in accordance with the present invention substantially all the lime is in the bonding constituents, and that there is no free lime in the refractory.

Naturally, the percentage composition of the refractory may vary somewhat, and it is not intended by the above example to limit the composition of the refractory thereto. The basic idea of the present invention is that the relationship between the refractory oxides and the bonding material of the refractory should be such as to maintain the refractory in equilibrium with the slag for a substantial period during "the heat" so as to prevent any substantial reaction or chemical interchanges between the refractory and the slag during said interval. The present refractory may be made by combining a calcium oxide containing material, such as dolomite, with a material having a high content of magnesia, together with such fluxes as are necessary to fulfill the conditions herebefore set forth, the combination of the materials being such that there shall be substantially no free lime in the finished product.

The high magnesia base may be any natural occurring material high in magnesia, such as magnesite or brucite, the latter being magnesium hydroxide, or any high magnesium base produced by processing materials containing small amounts of magnesia, such as dolomite and magnesia limestones. A high seventy per cent (70%) magnesia base may be produced from calcined dolomite by subjecting the dolomite to the action of water, whereby the lime dissolves to a very substantial degree and the magnesia remains insoluble, dewatering the material, and recovering the high magnesia content base.

The calcium or lime content of the new refractory may be furnished by any raw material, such as dolomite, calcium carbonate or the like, either uncalcined or calcined. The fluxing constituents may be furnished by any material which will combine with the lime to produce the bonding agent of the refractory and leave substantially no free lime in the final product. More specifically, the iron, manganese and silica content may be furnished by a number of fluxing materials including manganese ore, mill scale, silica, iron ore, or silicious iron ore, or by any equivalents thereof well known in the art. The manganese ore may be any ore which will furnish manganese oxide. Illustrative examples are pyrolusite, psilomelane, and rhodochrosite. It is to be understood that the fluxing materials added may vary considerably and still come within the present invention. For example, the fluxing material may be merely iron oxide or may be a mixture of manganese oxide and silica, or a mixture of iron oxide and silica. Further, while in the preferred form of the invention it is desirable to use iron oxides, manganese oxides and silica in admixture, or in any combination, the invention is not limited to merely using these materials as the fluxing agent. Other suitable fluxing materials, including oxides may be used. For example, the fluxing material may be alumina, or a material from which the alumina can be derived, or formed in situ in the refractory; or chromic oxide, or a material from which chromic oxide may be derived or by which the desired chromium content may be introduced into the refractory so as to assist in forming the bonding agent. In view of the above, it is obvious that the present invention includes, in its broadest aspect, a refractory having the herein described magnesia and lime relation together with bonding constituents, functioning as set forth.

It has been discovered it is very advantageous to produce the herein described refractory from a mixture of calcined or, preferably, a raw dolomite and a seventy per cent (70%) magnesia base, produced by calcining dolomite, slaking with water, and dewatering to recover the high magnesia base, as set forth in the application of William J. Young, Serial No. 74,368. The actual proportions in which these materials are mixed will vary with the composition of the dolomite, the magnesia base and the percentages of the magnesia and lime in the refractory. Thus, if a Millville dolomite is used containing twenty-one (21%) per cent magnesia and thirty-one per cent (31%) lime and a high magnesia base is used containing seventy per cent (70%) magnesia and twenty-eight per cent (28%) lime, the latter being the high magnesia base produced in accordance with the method set forth in the above identified Young application, the proportions will be one (1) part of dolomite to seven (7) parts of the high magnesia base. This will give the necessary and stipulated magnesia-lime ratio. In addition there is added iron oxides, manganese oxides, and silica to aggregate a total of approximately thirty-five per cent (35%) in the finished product, which is equivalent to about 3.8 parts in the raw materials. Hence on this basis, the materials would be mixed in the following proportions by weight:

| | Parts |
|---|---|
| Raw dolomite | 1 |
| High magnesia base | 7 |
| Silica+iron oxides+manganese oxides | 3.8 |

The mixture is burned in a rotary kiln. The kiln is preferably fired by gas, oil or powdered fuel to maintain the burning zone of the kiln at a temperature sufficiently high and for such a period of time as is necessary to bring about the desired reaction between the materials. The treatment temperature varies, preferably, between 2650° F. and 2800° F.

While the above is one way of carrying out the manufacture of the refractory, certain variations in the method are permissible. Thus, for example, although it is preferred to feed the fluxes, that is, the manganese ore, mill scale, silica, or silicious iron ore, with the calcium and magnesia bases, other methods of introducing one or more of the fluxes may be employed. For example, one or more of the fluxes may be introduced in admixture with the fuel, or all or some of the fluxes may be introduced at either end of the kiln by a separate air blast. The fluxes may be introduced in a finely divided form, or in larger particles.

While it is preferred to make the refractory by burning in an internally fired rotary kiln, it is within the province of the present invention to utilize any type of furnace which will produce the necessary high temperature to form the product herein described. More specifically, the invention may be carried out in an electric furnace, in an externally fired vertical kiln, or on any mechanical device, such as a chain or movable grate upon which the raw materials may be spread in a layer and heated to the required temperature of about 2650° F with any suitable fuel.

What is claimed is:—

1. A magnesia-containing refractory in the form of a reaction product consisting of approximately 70% refractory constituents and 30% bonding constituents in which the refractory constituents are periclase and compounds of magnesia and the bonding constituents are compounds of CaO with $SiO_2$ and $R_2O_3$ oxides, said refractory containing between 45% and 50% of magnesium oxide based on the weight of the refractory and containing no free lime.

2. A dead-burned magnesia refractory, said refractory comprising the reaction product of lime and magnesia, said product containing bases and fluxing oxides in such proportions that the amount of lime is less than the chemical equivalent of the fluxing oxides present and amounts approximately to 20% by weight of the weight of the refractory, and the amount of magnesia present is approximately 45% by weight of the refractory.

3. A dead-burned magnesia refractory, said refractory comprising the reaction product of lime and magnesia in which the product contains bases and fluxing oxides in such proportions that the amount of lime is less than the chemical equivalent of the fluxing oxides present, said refractory containing approximately 45% of magnesia, approximately 20% of lime, and fluxing oxides approximately in the amount of 35%, of which iron oxide is present in an amount of the order of 20%, said percentages being taken on the weight of the refractory.

4. A magnesia-containing refractory for furnaces adapted to contain a basic slag, said refractory being in the form of a reaction product, containing refractory oxide components consisting of magnesia and magnesia compounds including 40 to 50% of MgO based on the weight of the refractory, said components amounting to about 70% by weight of the refractory, the refractory also containing bonding constituents for the refractory components, said bonding constituents amounting to about 30% of the weight of the refractory and consisting of lime compounds, said refractory containing no free lime.

JOSEPH T. SINGEWALD, Jr.